United States Patent [19]

Hayer

[11] 4,052,628

[45] Oct. 4, 1977

[54] DYNAMIC, SHEAR-MODE PIEZOELECTRIC PRESSURE SENSOR

[75] Inventor: John R. Hayer, Yorba Linda, Calif.

[73] Assignee: Gulton Industries, Inc., Metuchen, N.J.

[21] Appl. No.: 678,225

[22] Filed: Apr. 19, 1976

[51] Int. Cl.² .............................................. H01L 41/04
[52] U.S. Cl. ................................ 310/333; 73/398 R; 73/517 R
[58] Field of Search .......................... 310/8.5, 8.6, 8.4; 73/398 R, 517 R, DIG. 4

[56] References Cited

U.S. PATENT DOCUMENTS

| | | | |
|---|---|---|---|
| 3,158,831 | 11/1964 | Boyer | 310/8.4 X |
| 3,727,084 | 4/1973 | Epstein | 310/8.4 X |
| 3,743,869 | 7/1973 | Hugli | 310/8.4 |

*Primary Examiner*—Mark O. Budd
*Attorney, Agent, or Firm*—Blakely, Sokoloff, Taylor & Zafman

[57] ABSTRACT

A dynamic pressure sensor employing piezoelectric ceramic elements in a shear mode. The ceramic elements are bolted in a sandwich-like assembly which includes collector plates to a support member; a piezoelectric compensating assembly is also bolted to this support member. The sensor provides high sensitivity and is particularly insensitive to vibration, case strains and the like.

7 Claims, 3 Drawing Figures

DYNAMIC, SHEAR-MODE PIEZOELECTRIC PRESSURE SENSOR

BACKGROUND OF THE INVENTION

1. Field of the Invention

The invention relates to the field of dynamic pressure sensors, particularly those employing piezoelectric elements.

2. Prior Art

Piezoelectric elements are known in the prior art and have been used in various transducers. Typically, these elements are polarized during fabrication and then cut in predetermined orientations for use in different modes of operation. Often transducers employ these piezoelectric element in either a bending mode, compression mode or shear mode. In the shear mode, one configuration which is utilized is sometimes referred to as the "bolted shear". In this configuration the piezoelectric elements are sandwiched between collector plates and bolted, along with these plates, to a support member. With this construction epoxy bonding is not required; moreover, this configuration is particularly insensitive to both acoustical excitation of the case and acceleration. Also with this "bolted shear" arrangement, the support member provides isolation from the strains in the base of the support member, and isolation from temperature gradients.

While in the prior art, piezoelectric elements operating in a shear mode have been employed in accelerometers, they have not been successfully employed in dynamic pressure sensors. The present invention employs the piezoelectric elements in a bolted arrangement, and thus obtains many of the advantages to this structure for a dynamic pressure sensor.

In U.S. Pat. No. 3,487,238 an accelerometer is disclosed which employs a piezoelectric element in a compression mode. This patent describes the manner in which the piezoelectric crystal may be fabricated and temperature compensation means which allows this accelerometer to successfully operate over a wide range of temperatures. As will be described in more detail in this application, the piezoelectric ceramic fabrication process of this patent may be employed to fabricate the piezoelectric elements used in the presently preferred embodiment.

SUMMARY OF THE INVENTION

A dynamic pressure sensor which is particularly adaptable for use in a high vibration environment is described. The sensor employs piezoelectric elements which operate in a shear mode. A support member which includes a pair of flanges and a base threadingly engages the sensor case or housing. The piezoelectric pressure sensing assembly engages one of these flanges and is coupled to a diaphragm through a pressure coupler. The piezoelectric elements and collectors are bolted to this flange. A second piezoelectric assembly which also includes piezoelectric elements and collectors is bolted to the other flange. This second assembly includes weights which place shear loads on the piezoelectric elements when the sensor is accelerated to provide compensation for vibratory acceleration, and case strains. The dynamic pressure sensor is suitable for sensing small pressure fluctuations at high "steady state" pressures.

DETAILED DESCRIPTION OF THE INVENTION

A dynamic pressure sensor is described which is particularly suitable for use in a high vibration environment. The sensor employs two sensing assemblies, one for sensing dynamic pressure and the other for providing compensation for vibratory acceleration, dynamic case strains, and the like. Both sensing assemblies employ piezoelectric elements in a sandwich-like construction which is bolted to a common support member.

Figure 1:
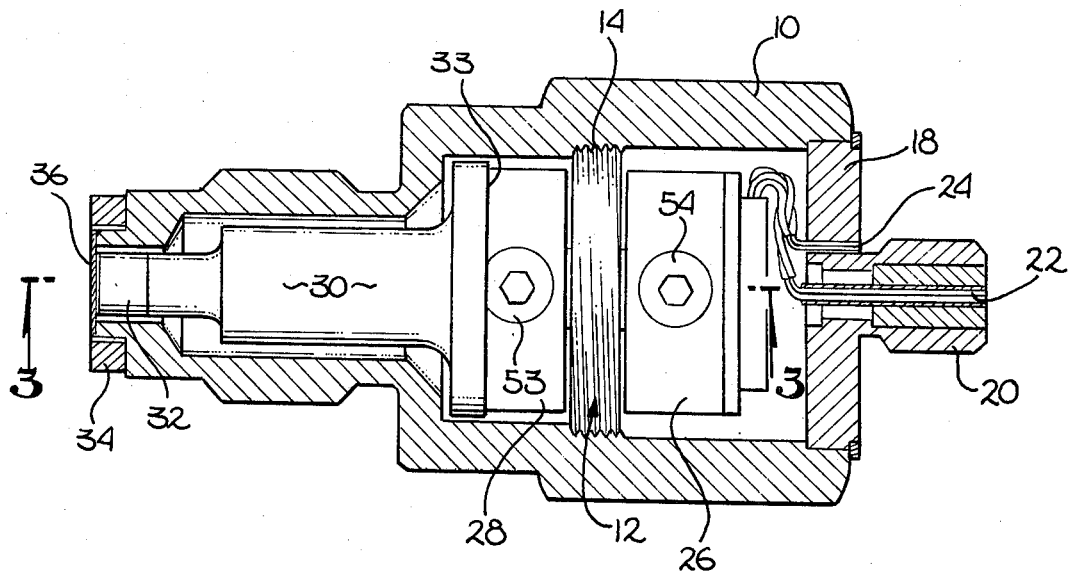
FIG. 1 is a partial cross-sectional view of the sensor and illustrates the sensor case and sensing assemblies mounted within the case.

Referring first to FIG. 1, the sensor housing or case 10 is a generally hollow, cylindrical member defining an interior space. The case 10 is open at opposite ends; one end of this case receives a diaphragm 36 while the other end receives a connector cap 18. The interior of case 10 adjacent to diaphragm 36 receives a pressure coupler 30 and the interior of the case 10 adjacent to cap 18 receives sensing assemblies 26 and 28 as will be described in more detail. The interior of case 10 includes threads 14 for securing the support member 12 for these assemblies within the interior of the case. In the presently preferred embodiment, the case 10 is fabricated from Inconel, a trademark of the International Nickel Company (See Page 203, *Handbook of Material Trade Names* by Zimmerman and Levine for composition details); however other metals may be employed.

A circular diaphragm 36 is mounted to the end of the case 10 by a washer 34. The diaphragm 36 may be fabricated from Inconel (718) or other suitable material. In the presently preferred embodiment the washer 34 is a stainless steel washer which is welded to the case 10 to secure the diaphragm in place. At the other end of the case 10, the connector cap 18 is welded to the case 10 once the sensing assemblies are secured within the housing. The connector cap 18 includes the coaxial type connector 20 for allowing electrical signals generated by the sensor assemblies to be externally sensed. The center lead of this connector is shown as lead 22; for the disclosed embodiment, the outer lead is common with lead 24 and is grouned to the case 10.

Figure 2:
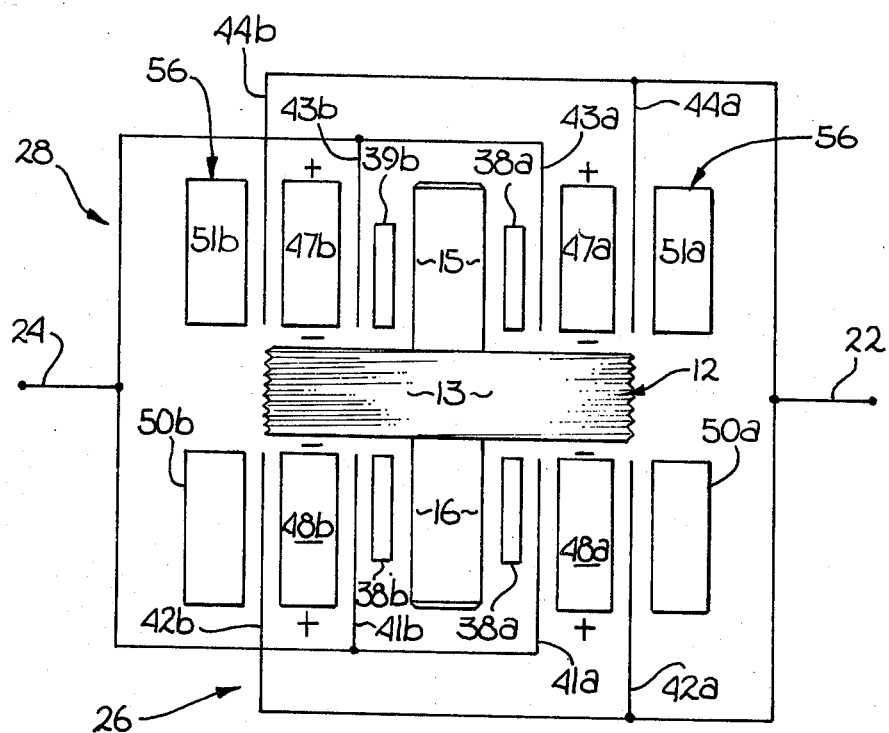
FIG. 2 is a schematic drawing of the sensing assemblies primarily used to illustrate electrical connections and the orientation of the piezoelectric elements within the assemblies.
Figure 3:
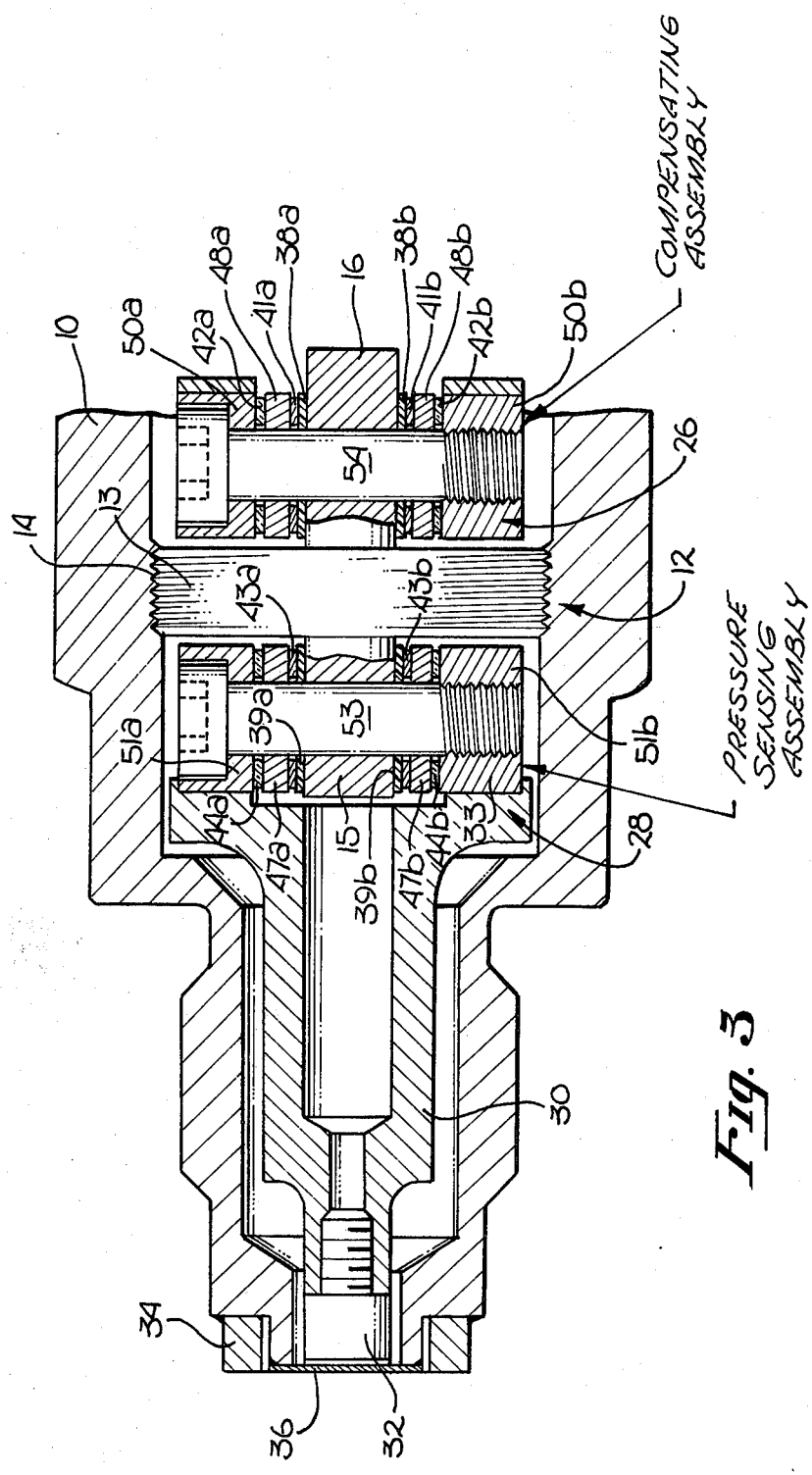
FIG. 3 is a partially-cutaway, cross-sectional view of the sensor of FIG. 1 taken through section line 3—3 of FIG. 1.

Referring now to FIGS. 2 and 3, both the pressure sensing assembly 28 and the compensating assembly 26 are bolted to the support member 12. This support member includes a generally cylindrical base which cooperatively engages the threads 14 of case 10, and a pair of flanges 15 and 16 (FIG. 2) which transversely projects from opposite surfaces of this base. Each flange forms a pair of parallel surfaces which receive the sandwich-like sensing assemblies. Also each flange includes a generally, centrally disposed, bore for allowing a bolt to pass through the flange, such as bolt 53 which passes through the flange 15 and bolt 54 which passes through the flange 16. In the presently preferred embodiment the support member 12 is fabricated from stainless steel (303).

The pressure sensing assembly 28 as shown in FIGS. 2 and 3 is substantially symmetrical about the opposite faces of flange 15. One unit of this assembly includes a piezoelectric element 47a disposed between and abutting a pair of collector plates 43a and 44a. The collector plate 43a is insulated from one face of flange 15 by an insulator 39a. The collector plate 44a abuts a cap 51a which cap includes a bore for receiving the bolt 53 and a counter bore for receiving the head of this bolt. The other unit of this pressure sensing assembly includes a piezoelectric element 47b disposed between a pair of collector plates 43b and 44b. The collector plate 43b is insulated from the other face of flange 15 by a insulator 39b while the collector plate 44b abuts a cap 51b. Cap 51b is threaded to receive the end of bolt 53. The insulators, collector plates and piezoelectric elements each include bores such that the bolt 53 may freely pass through these members. Thus, the bolt 53 secures these members to the opposite faces of the flange 15. As will be dicussed in more detail, a generally annular surface 33 of the pressure coupler 30 contacts the caps 51a and 51b such that pressure from the diaphragm 36 is transmited to these members. In this manner, pressure applied to diaphragm 36 is transmitted through the pressure coupler 30 to the caps 51a and 51b thereby placing the piezoelectric elements 47a and 47b in shear. The application of the force to the cap members 51a and 51b is illustrated diagrammatically in FIGURE by arrows 56.

The generally rectangular collector plates 43a and 43b, and 44a and 44b, in the presently preferred embodiment, are approximately 0.004 inches thick and are fabricated from a stainless steel or Inconel. These plates are gold plated to assure contact with the piezoelectric elements. Each of the collector plates include integral elongated tabs (not illustrated) to permit the collector plates to be soldered to wires as will be explained in conjunction with FIG. 2. The caps 51a and 51b may be fabricated from an aluminum alloy and include a flat surface for engaging the annular surface 33 of pressure coupler 30. The insulators 39a and 39b are also generally rectangular members fabricated, in the presently preferred embodiment, from steatite.

The generally rectangular piezoelectric ceramic elements 47a and 47b, employed in the presently preferred embodiment, may be fabricated from commercially available piezoelectric materials. A process for manufacturing this material is described in U.S. Pat. No. 3,487,238. However, the process described in this patent results in elements which are sensitive in a compression mode ($d_{33}$) whereas in the present invention the elements are sensitive in a shear mode ($d_{15}$). (See IRE Standards on Piezoelectric Crystals: Measurements of Piezoelectric Ceramics, 1961). Thus, the collector plates are oriented in different planes for the shear mode. The surface of the piezoelectric elements which contact the collector plates are gold plated to assure contact between these elements and the collector plates. In the presently preferred embodiment, the piezoelectric elements are approximately 0.040 inches thick and provide (in the shear mode) an output of at least $4.0 \times 10^{-15}$ coul/dyne.

As is illustrated in FIGS. 1 and 3, a general elongated cylindrically shaped pressure coupler 30 and an adapter 32 couple diaphragm 36 with the caps 51a and 51b of the pressure sensing assembly. One end of coupler 30 defines the annular surface 33, which surface is transverse to the axis of the coupler. Portions of this surface, as mentioned, contact the caps 51a and 51b. The other end of this coupler includes a bore for receiving the adapter 32. In the presently preferred embodiment the coupler is fabricated from an aluminum alloy; the adapter is fabricated from Inconel.

In the compensating assembly 26 piezoelectric element 48a which may be the same as elements 47a and 47b is disposed between and abutting a pair of collector plates 41a and 42a. These collector plates may be the same as the collector plates 44a and 44b, and 43b of the pressure sensing assembly. An insulator 38a which may be the same insulator as insulator 39a and 39b is disposed between the collector 41a and one face of flange 16. The other unit of the compensating assembly is symmetrical with the above described unit of this assembly and includes a piezoelectric element 48b disposed between a pair of collector plates 41b and 42b. The collector plate 41b is insulated from the opposite face of flange 16 by the insulator 38b.

A weight 50a of the compensating assembly includes a bore for receiving the bolt 54 and a counter bore for receiving the head of this bolt. This weight is in contact with the collector plate 42a. This bolt threadingly engages a weight 50b which weight contacts a surface of the collector plate 42b. In the presently preferred embodiment the weight of weights 50a and 50b is approximately equal to the weight associated with caps 51a and 51b, pressure coupler 30 and adapter 32 to compensate for these components in acceleration.

In fabrication of the assemblies 26 and 28 care must be taken to assure that the abutting surface of the collector plates and piezoelectric elements are relatively flat and parallel.

Referring now to FIG. 2 the various components of assemblies 26 and 28 are shown in diagrammatical form with the collector plates 44a and 44b of the pressure sensing assembly 28 connected to lead 22 and the collector plates 43a and 43b of this assembly connected to lead 24. In the compensating assembly 26 the collector plates 42a and 42b are connected to lead 22 and the collector plates 41a and 41b are connected to lead 24. The polarity of the ceramic piezoelectric elements of the pressure sensing assembly 28 are disposed such that the "+" side of element 47a and the "+" side of element 47b face away from base 13. In the compensating assembly the "+" sides of the elements 48a and 48b also face away from base 13. In this manner, compensation is provided by the compensating assembly 26. Thus, if the sensor is subjected to acceleration along its axis the signal produced by the pressure sensing assembly resulting from this acceleration is cancelled since a signal of equal magnitude but of opposite polarity is applied to leads 22 and 24 by the compensating assembly.

Referring to FIG. 1 for the described embodiment lead 24 is coupled to the case 10 and lead 22 is coupled to the center lead of the connector 20, thus providing an output signal on lead 22 relative to the potential of the case 10. It will be appreciated, however, that lead 24 need not be grounded to the case 10 but rather coupled to a pin within a connector. In such an embodiment it may be desirable to utilize insulators between the collector plates and the caps 51a and 51b, and the weights 50a and 50b.

It will be apparent that once the sensor assemblies are fabricated on support member 12, the member 12 may readily be inserted within the case 10 and held therein by threads 14. During such installation the adapter 32 is positioned in intimate contact with the diaphragm 36 to assure that the elements 47a and 47b are placed in shear when pressure is applied to the diaphragm 36. As dynamic pressure is applied to the diaphragm 36 the elements 47a and 47b are placed in dynamic shear providing an output signal on line 22. As is known in the art such piezoelectric elements have linear characteristics, therefore output on lead 22 is substantially linear with respect to dynamic pressure.

Thus, with the disclosed dynamic pressure sensor, dynamic pressure may be accurately sensed over a wide range of "steady state" pressures. Automatic compensation is provided for acceleration and other dynamic strains placed on the sensor.

I claim:

1. A dynamic pressure sensor comprising:
   a housing;
   a support member comprising a base for engaging said housing, a first mounting member having two parallel surfaces and an aperture disposed between said surfaces and a second mounting member having two parallel surfaces and an aperture disposed between said surfaces;
   a first piezoelectric electric unit for providing an electrical signal when subjected to a dynamic shear load, said first unit being disposed on one of said two parallel surfaces of said first mounting member and including an aperture in alignment with said aperture of said first mounting member;
   a second piezoelectric unit for providing an electrical signal when subjected to a dynamic shear load, said second unit being disposed on said other surface of said first mounting member and including an aperture in alignment with said aperture of said first mounting member;
   bolt means disposed through said apertures of said first mounting member and said first and second piezoelectric units for securing said units to said first mounting member;
   coupling means for receiving dynamic pressure loads and for coupling said loads to said bolt means; and,
   piezoelectric sensing means for sensing acceleration mounted to said second mounting member, said sensing means for providing compensation for acceleration;
   whereby dynamic pressure sensed by said coupling means is coupled to said bolt means thereby placing shear loads on said first and second piezoelectric units.

2. The pressure sensor defined by claim 1 wherein said piezoelectric sensing means for sensing acceleration comprises:
   a third piezoelectric unit for providing an electrical signal when subjected to a dynamic shear load, said third unit being disposed on one of said two parallel surfaces of said second mounting member and including an aperture in alignment with said aperture of said second mounting member;
   a fourth piezoelectric unit for providing an electrical signal when subjected to a dynamic shear load, said fourth unit being disposed on the other said surface of said second mounting member and including an aperture in alignment with said aperture of said second mounting member;
   a bolt disposed through said aperture of said second mounting member and said apertures of said third and fourth piezoelectric units for securing said units to said second mounting member.

3. The pressure sensor defined by claim 2 wherein said first and second piezoelectric units are electrically coupled to said third and fourth piezoelectric units such that electrical signals produced by said first and second units resulting from acceleration of said sensor are cancelled by electrical signals produced by said second and third units.

4. The pressure sensor defined by claim 3 including a pair of weights, one said weights being disposed abutting the head of said bolt and said third piezoelectric unit, and the other said weights being disposed at the opposite end of said bolt abutting said fourth piezoelectric unit said weights for providing shear loads on said third and fourth piezoelectric units when said sensor is subjected to acceleration.

5. The pressure sensor defined by claim 4 wherein the weight of said weights approximately equals the weight applied to said first and second piezoelectric units by said bolt means and said coupling means.

6. The pressure sensor defined by claim 5 wherein said first mounting member and second mounting member comprise a pair of flanges projecting from opposite faces of said base.

7. The pressure sensor defined by claim 6 wherein each of said piezoelectric units comprise a piezoelectric element disposed between a pair of collector plates.

* * * * *

UNITED STATES PATENT AND TRADEMARK OFFICE
CERTIFICATE OF CORRECTION

PATENT NO. : 4,052,628
DATED : October 4, 1977
INVENTOR(S) : JOHN R. HAYER

It is certified that error appears in the above-identified patent and that said Letters Patent are hereby corrected as shown below:

Column 2, Line 53: change "grouned" to --grounded--.

Column 4, Line 10: after "and" and before "43b" insert --43a and--.

Signed and Sealed this

Twenty-first Day of February 1978

[SEAL]

Attest:

RUTH C. MASON
Attesting Officer

LUTRELLE F. PARKER
Acting Commissioner of Patents and Trademarks